(12) United States Patent
Venderbosch et al.

(10) Patent No.: US 11,349,388 B2
(45) Date of Patent: May 31, 2022

(54) POWER FACTOR CONVERTER

(71) Applicants: SFC Energy B.V., Almelo (NL); B/E AEROSPACE, INC., Winston-Salem, NC (US)

(72) Inventors: Herbert Venderbosch, Bathmen (NL); Jorge Antonio Pacheco Morocho, Culemborg (NL)

(73) Assignees: SFC ENERGY B.V., Rg Almelo (NL); B/E AEROSPACE, INC., Winston-Salem, NC (US)

( * ) Notice: Subject to any disclaimer, the term of this patent is extended or adjusted under 35 U.S.C. 154(b) by 0 days.

(21) Appl. No.: 16/979,405

(22) PCT Filed: Mar. 11, 2019

(86) PCT No.: PCT/EP2019/055996
§ 371 (c)(1),
(2) Date: Sep. 9, 2020

(87) PCT Pub. No.: WO2019/170910
PCT Pub. Date: Sep. 12, 2019

(65) Prior Publication Data
US 2021/0083569 A1    Mar. 18, 2021

Related U.S. Application Data

(60) Provisional application No. 62/641,100, filed on Mar. 9, 2018.

(51) Int. Cl.
*H02M 1/42* (2007.01)

(52) U.S. Cl.
CPC ....... *H02M 1/4225* (2013.01); *H02M 1/4233* (2013.01)

(58) Field of Classification Search
CPC ..... H02M 1/4225; H02M 1/4233; H02M 1/42
See application file for complete search history.

(56) References Cited

U.S. PATENT DOCUMENTS

| | | | |
|---|---|---|---|
| 5,045,991 A * | 9/1991 | Dhyanchand | H02M 1/4233 363/89 |
| 5,892,674 A | 4/1999 | Shimada et al. | |
| 10,348,127 B2 * | 7/2019 | Fang | H02J 9/062 |
| 2012/0300519 A1 | 11/2012 | Clemmons | |

OTHER PUBLICATIONS

International Search Report issued by European Patent Office for Application No. PCT/EP2019/055996 dated May 21, 2019.
Written Opinion issued by European Patent Office for Application No. PCT/EP2019/055996.

* cited by examiner

*Primary Examiner* — Gary L Laxton
(74) *Attorney, Agent, or Firm* — Moore & Van Allen, PLLC; Henry B. Ward, III

(57) ABSTRACT

A multi-phase power factor converter is disclosed. In embodiments, each phase of the power factor converter includes a voltage measurement circuit, a boost coil, a current measurement circuit, and a comparator. The voltage measurement circuit is configured to detect an input voltage. The current measurement circuit configured to detect a current in the boost coil. The comparator configured to compare the input voltage to the current in the boost coil, and a plurality of transistors (e.g., forming a MOSFET bridge) are driven by an output of the comparator.

12 Claims, 17 Drawing Sheets

POWER FACTOR CONVERTER

CROSS-REFERENCE TO RELATED APPLICATIONS

The present application claims the benefit under 35 U.S.C. § 119(e) of U.S. Provisional Application Ser. No. 62/641,100, filed Mar. 9, 2018, and titled "POWER FACTOR CONVERTER," which is incorporated herein by reference in its entirety.

BACKGROUND

Power supplies may include power factor converters for delivering high efficiency DC power output to inserts and components of an airworthy environment (e.g., an aircraft galley). Conventional power factor converters may require an external bridge rectifier (e.g., a Vienna rectifier) and a highly complex control loop to generate driver signals toward the metal-oxide-semiconductor field-effect transistor (MOSFET) gates of the rectifier, which is normally implemented via digital signal processing (DSP). To reduce the need for external components and complex DSP, an improved power factor converter architecture that does not require a separate bridge rectifier or complex switching control software is needed.

SUMMARY

In an aspect, embodiments of the inventive concepts disclosed herein are directed to a power factor converter. In embodiments, the power factor converter is a multi-phase power factor converter with each phase of the power factor converter including a voltage measurement circuit, a boost coil, a current measurement circuit, and a comparator. The voltage measurement circuit is configured to detect an input voltage. The current measurement circuit configured to detect a current in the boost coil. The comparator configured to compare the input voltage to the current in the boost coil, and a plurality of transistors (e.g., forming a MOSFET bridge) are driven by an output of the comparator.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
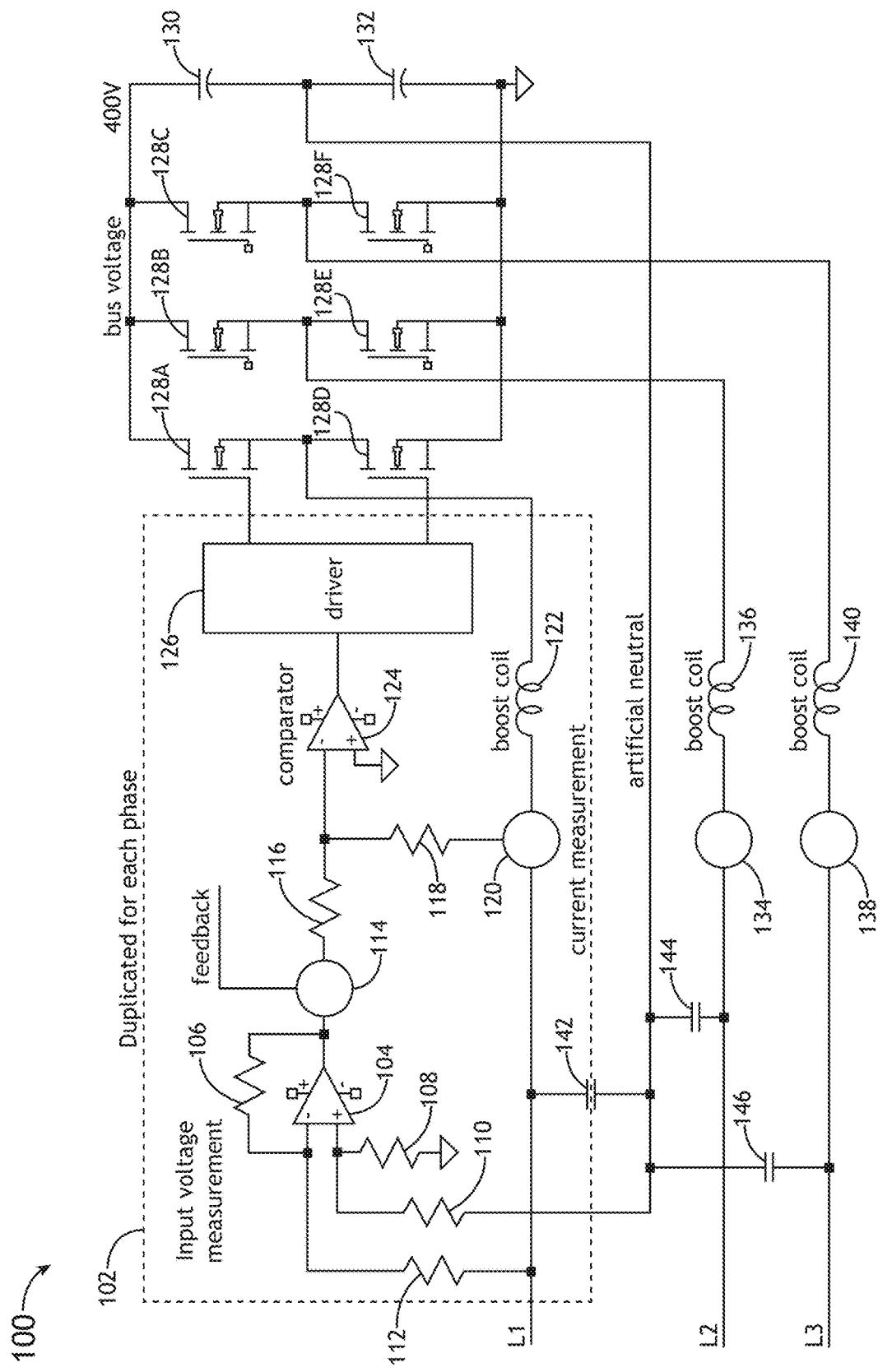
FIG. 1 is a simplified schematic illustration of a power factor converter (PFC), in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a power factor converter for delivering high efficiency DC power output to inserts and components of an airworthy environment (e.g., an aircraft galley) without the need for a separate bridge rectifier or complex switching control software. Conventional power supply converters for a power supply unit (PSU) may require an external bridge rectifier (e.g., a Vienna rectifier) and a highly complex control loop to generate driver signals toward the metal-oxide-semiconductor field-effect transistor (MOSFET) gates of the rectifier, which may normally be implemented via digital signal processing (DSP). A power factor converter (PFC) according to the inventive concepts disclosed herein may be a bridgeless (e.g., without a separate bridge rectifier) multi-phase boost converter (e.g., three-phase boost converter). In embodiments, the heart of the PFC is a MOSFET bridge including a plurality of (e.g., six or more) transistors (e.g., semiconductor field-effect transistors (MOSFETs), such as silicon carbide (SiC) MOSFETs, or the like). Each of the phases may include a half bridge MOSFET totem pole which forms, together with the boost coils and electrolytic bus capacitors, a bidirectional boost converter. In other words, the boost converter may be capable of handling both positive and negative currents.

A power supply unit (PSU) incorporating the PFC disclosed herein may be capable of delivering DC power output to one or more galley inserts (e.g., microwaves, coffee makers, ovens, etc.) or other components with the need for a separate bridge rectifier. Furthermore, the PFC may provide extremely low harmonic distortion (e.g., THD<1.5%) for both normal and abnormal three-phase voltage conditions associated with aircraft galleys (see, e.g., RTCA DO-160). The PFC may provide DC power output at an efficiency up to 98% and at a Power Factor index approaching 1 (e.g., >0.997). The PFC may not require complex switching software in order to control the switching behavior at any load.

FIG. 1 is a simplified schematic illustration of a PFC 100, in accordance with example embodiments of this disclosure. In embodiments, each phase (e.g., phase 102) of the PFC 100 includes a voltage measurement circuit (e.g., comparator 104 and associated circuitry), a current measurement circuit 120, a high-speed comparator 124, a boost coil 122 and a totem pole MOSFET bridge (e.g., MOSFETS 128) with gate drive circuit 126 (sometimes referred to herein as the "driver stage," "driver circuit" or simply the "driver"). The current of phase 102 (e.g., the current from load connection L1 and/or boost coil 122) may be injected into a common electrolytic bus capacitor 142 with a common feedback circuit (e.g., current measurement circuit 120 and associated circuitry (e.g., resistor 118, etc.)) configured to adjust the voltage on the bus capacitor 142. Each phase of the PFC 100 may be similarly configured. For example, the current from load connection L2 and/or boost coil 136 may be injected into electrolytic bus capacitor 144 with a common feedback circuit (e.g., current measurement circuit 134 and associated circuitry) configured to adjust the voltage on the bus capacitor 144. Similarly, the current from load connection L3 and/or boost coil 140 may be injected into electrolytic bus capacitor 146 with a common feedback circuit (e.g., current measurement circuit 138 and associated circuitry) configured to adjust the voltage on the bus capacitor 146. The PFC phases for L2 and L3 may include the same components as phase 102 in a same or substantially similar arrangement/configuration. Accordingly, any description of phase 102 or its components is applicable to any other phase of the PFC 100.

The voltage measurement circuit includes comparator 104 and associated circuitry, such as, but not limited to, resistors 106, 108, 110, and 112. The voltage measurement circuit is configured to measure the voltage between one line (L1) and an artificial neutral defined at a node between the electrolytic output capacitors 130 and 132. In embodiments, a filter capacitor (e.g., bus capacitor 142) of each phase (e.g., phase 102 for L1 and respective phases for L2 and L3) can be coupled at one end to the artificial neutral. The output voltage of the voltage measurement circuit (e.g., output of comparator 104) is used as the input for current regulation. For example, a current regulation circuit 114 may be controlled by a feedback signal and configured to regulate the amplitude of a sinewave signal input for comparator 124. The current regulation circuit 114 may have associated circuitry, such as, but not limited to, resistor 116.

In embodiments, the MOSFETS 128 are driven in such way that the input voltage shape is followed accurately by the input current. To do this the measured input voltage is compared to the current in the boost coil 122 by the highspeed comparator 124. Because the comparator 124 only has two output states, it will try to make the coil-current equal to the input voltage by a continuous switching action. The switching frequency is variable during the line frequency period and line voltage. The average switching frequency is determined by the total delay in the switching loop. In embodiments, each of the phases may include a half bridge MOSFET totem pole (MOSFETs 128) which forms, together with the boost coils 122, 136, and 140 and electrolytic bus capacitors 142, 144, and 146, a bidirectional boost converter. In other words, the boost converter may be capable of handling both positive and negative currents. The boost coils 122, 136, and 140 of respective ones of the phases may be coupled to nodes between respective pairs of the MOSFETs 128. For example, boost coil 122 may be coupled to a node between MOSFETs 128A and 128D, where MOSFET 128A has a first terminal coupled to the boost coil 122 and a second terminal coupled to output capacitor 130, and MOSFET 128D has a first terminal coupled to the boost coil 122 and a second terminal coupled to output capacitor 132. Similarly, boost coil 136 may be coupled to a node between MOSFETs 128B and 128E, where MOSFET 128B has a first terminal coupled to the boost coil 136 and a second terminal coupled to output capacitor 130, and MOSFET 128E has a first terminal coupled to the boost coil 136 and a second terminal coupled to output capacitor 132. Similarly, boost coil 140 may be coupled to a node between MOSFETs 128C and 128F, where MOSFET 128C has a first terminal coupled to the boost coil 140 and a second terminal coupled to output capacitor 130, and MOSFET 128F has a first terminal coupled to the boost coil 140 and a second terminal coupled to output capacitor 132.

Although this disclosure makes reference to MOSFETs, it is contemplated that other types of transistors may be used in place of or in conjunction with MOSFETs. For example, a transistor bridge including bipolar junction transistors (BJTs) and/or other types of transistors may be implemented in place of the MOSFET bridge.

Figure 2:
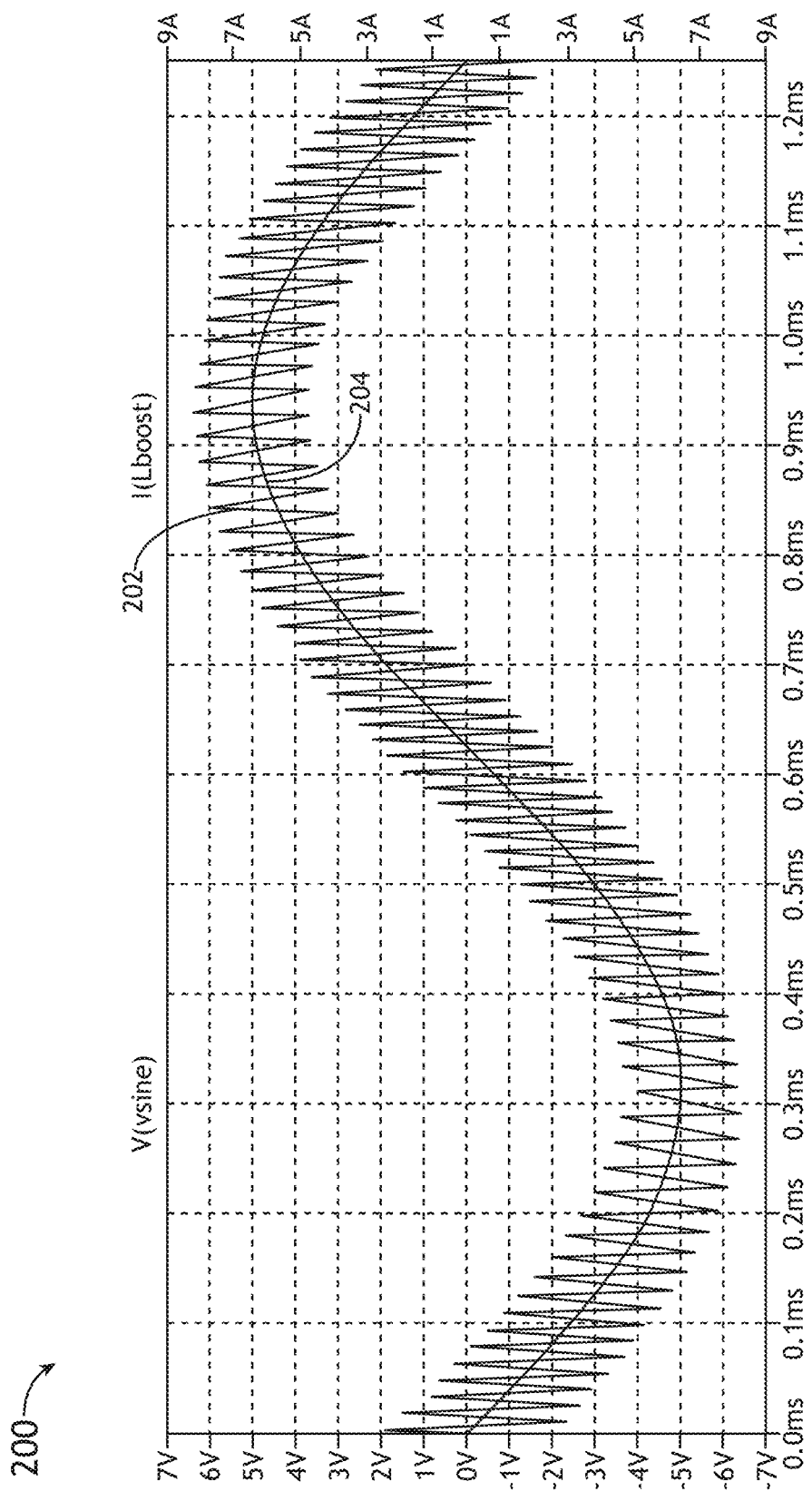
FIG. 2 is a graphical illustration of boost coil and input voltage waveforms, in accordance with example embodiments of this disclosure.

FIG. 2 is a graphical illustration of boost coil 202 and input voltage 204 waveforms, in accordance with example embodiments of this disclosure. As illustrated in FIG. 2, the boost coil 202 may have a sinusoidal waveform that is referenced to the input voltage 204. For example, the sinusoidal waveform may be extracted by subtracting the input voltage 204 from of the boost coil 202 waveform.

Figure 3A:
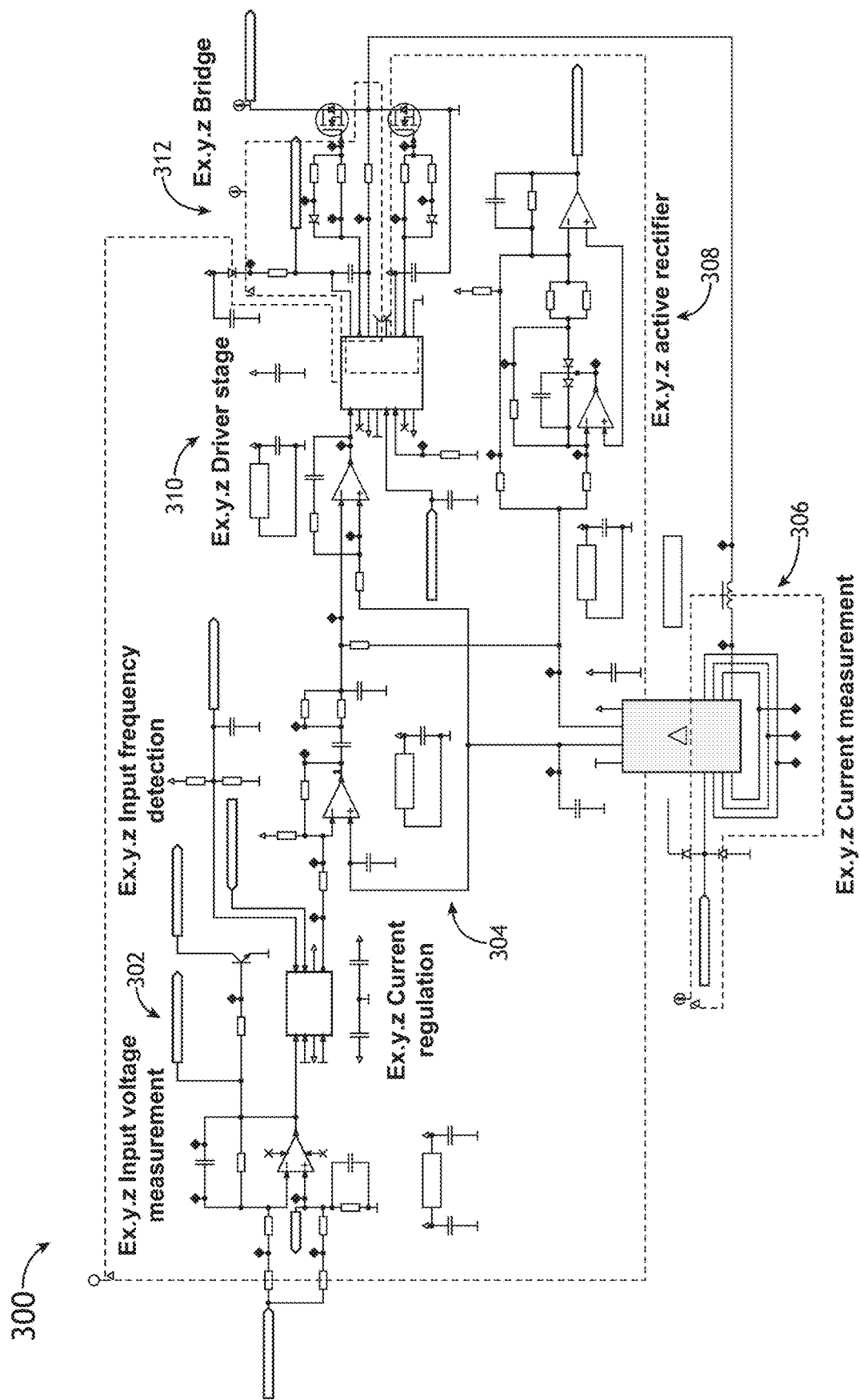
FIG. 3A is a schematic illustration of one phase of a power factor converter (PFC), in accordance with example embodiments of this disclosure.

FIGS. 3A through 3G are schematic illustrations of one phase 300 of a PFC, such as the PFC 100 described above, in accordance with example embodiments of this disclosure. As shown in FIG. 3A, each phase 300 may include an input voltage measurement circuit 302, a current regulation circuit 304, a current measurement circuit 306, an active rectifier 308, a driver stage 310, and a MOSFET bridge 312.

Figure 3B:
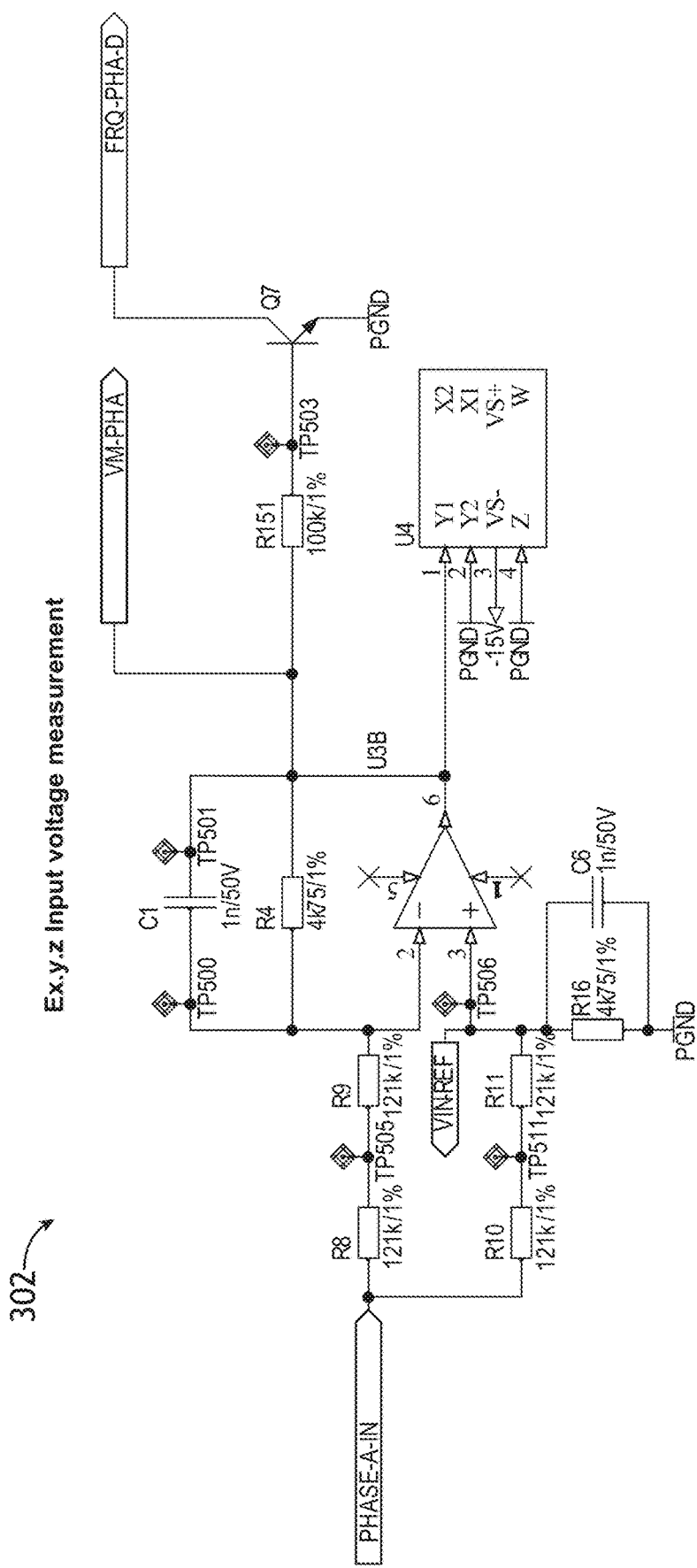
FIG. 3B is a schematic illustration of an input voltage measurement circuit for one phase of a power factor converter (PFC), in accordance with example embodiments of this disclosure.
Figure 3C:
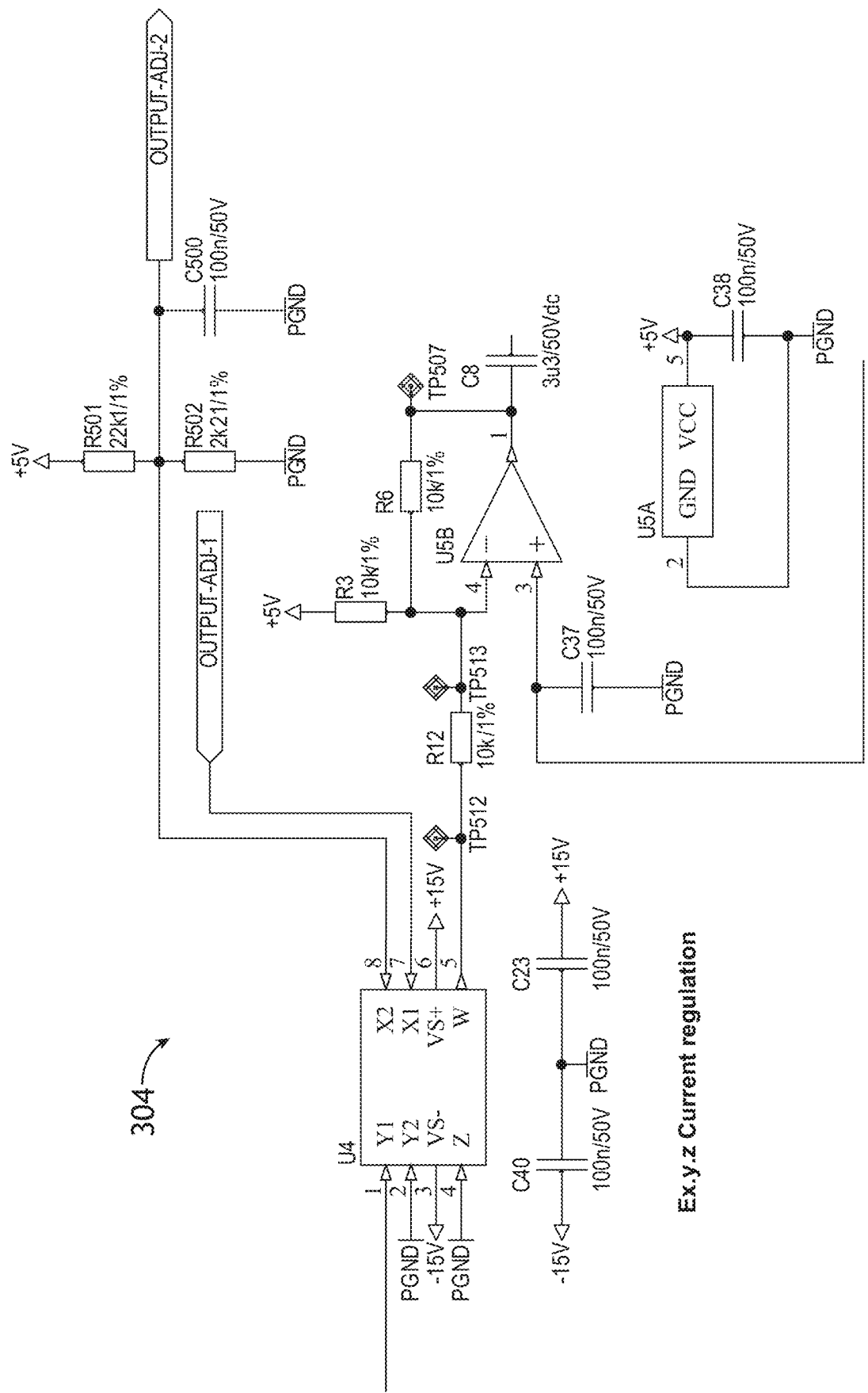
FIG. 3C is a schematic illustration of a current regulation circuit for one phase of a power factor converter (PFC), in accordance with example embodiments of this disclosure.

Referring to FIG. 3B, the input voltage measurement circuit 302 includes a differential amplifier circuit including an operational amplifier ("opamp") and a resistor network.

In an example embodiment, the resistor network divides the voltage by Vdivide=(R8+R9)/R4=242 k/4k75=51.

The resistors connected to PHA-IN and/or VNEUTRAL may carry relatively high voltage and may therefore be implemented by two separate resistors.

In an example embodiment, VPHA-IN=Line voltage+½ Vbus=115 VAC+200V=230 Vrms, where resistors R8 and R9 may carry approximately 115V each.

In an example embodiment, Vneutral=½ Vbus=+200V, where resistors R10 and R11 carry approximately 100V each.

In an example embodiment, the power dissipation is a follows:

$PR8=\frac{1}{2}U^2/R8=(115)^2/121k=0.11$ W $PR9=\frac{1}{2}U^2/R8=(100)^2/121k=0.082$ W In an example embodiment, R8, R9, R10, R11 resistors are selected to have a 1206 footprint, for example:
CS-234-456 CRCW1206121K (?) Pmax.=250 mW Vrating=200V In an example embodiment, resistors R4 and R16 are approximately 4k750 resistors with a 0603 footprint, for example:
CS-234-842 CRCW06034K75 (?) Pmax.=100 mW Vrating=75V Referring to FIG. 3C, the current regulation circuit 304 regulates the amplitude of the sinewave voltage for the PFC switching stage. The DC voltage (OUTPUT-ADJ-1) coming from the feedback circuit, regulating the 400V bus voltage, is fed to a multiplier integrated circuit (IC) U4. OUTPUT-ADJ-2 is a small DC voltage (e.g., 0.45V), which is fed to input X1 of the multiplier U4, allowing the transfer function to become negative. This means the phase of the sinewave is inverted and energy is transferred to the source. This is needed to be able to regulate the 400V output at zero load.

In an example embodiment, the transfer function of the multiplier U4 is:

$$W = \frac{(X1 - X2)(Y1 - Y2)}{10 \text{ V}} + Z$$

In an example with Y2 and Z=0 and X1=0.45V, the transfer function becomes:

$W=Y2/10*(0.45-X2)$

In an example embodiment, the output signal of the multiplier (W) is fed to a level shifter U5B, which tilts the output to 2.5V DC output level. This is because the current transducer is working on a 2.5V offset level. To remove any DC voltage going to the PFC driver stage 310, a capacitor C8 (e.g., a 3.3 uF capacitor) can be added at the output of the level shifter U5B. In an example embodiment, the capacitor C8 may be a film capacitor to prevent distortion of the sinewave signal.

Figure 3D:
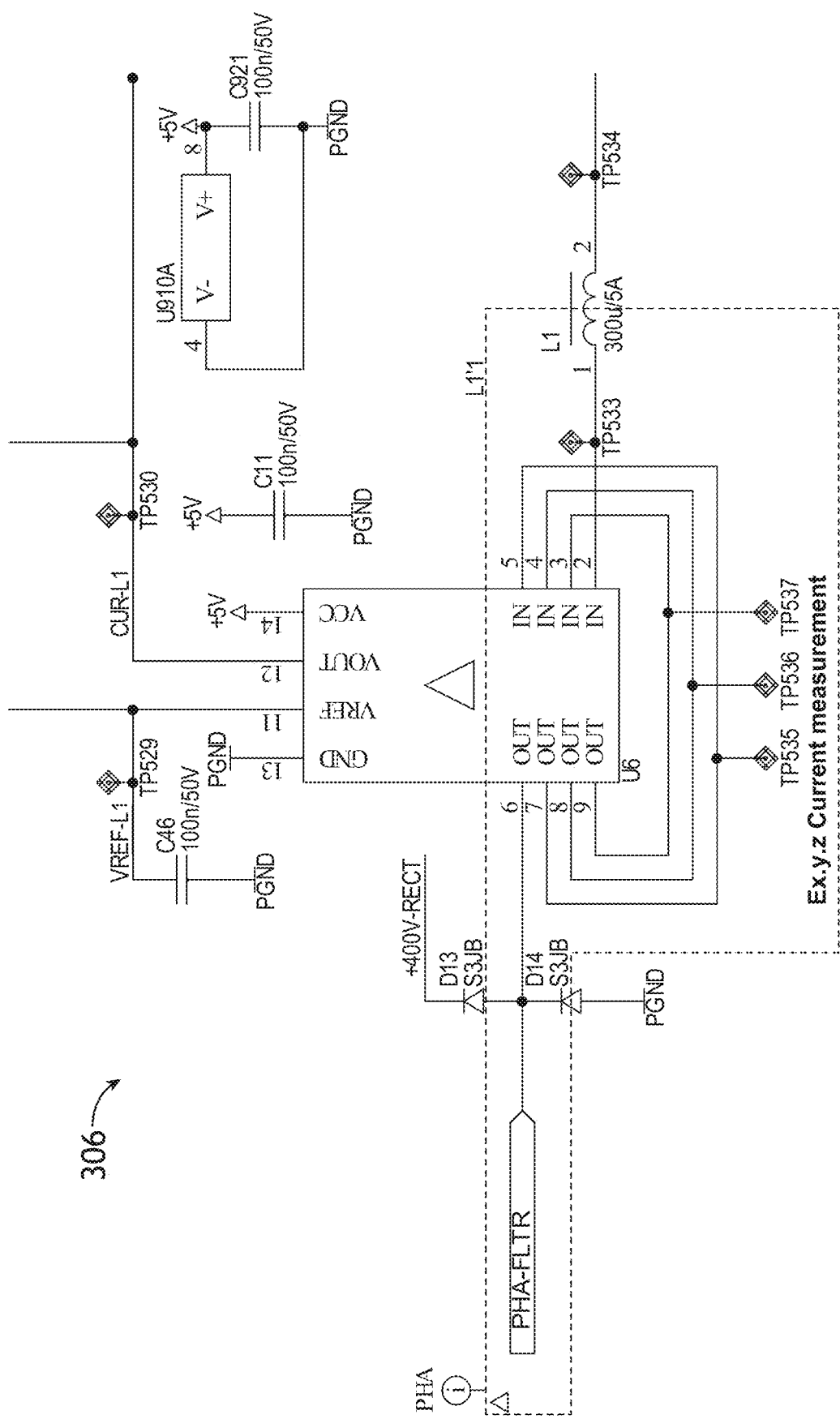
FIG. 3D is a schematic illustration of a current measurement circuit for one phase of a power factor converter (PFC), in accordance with example embodiments of this disclosure.
Figure 3E:
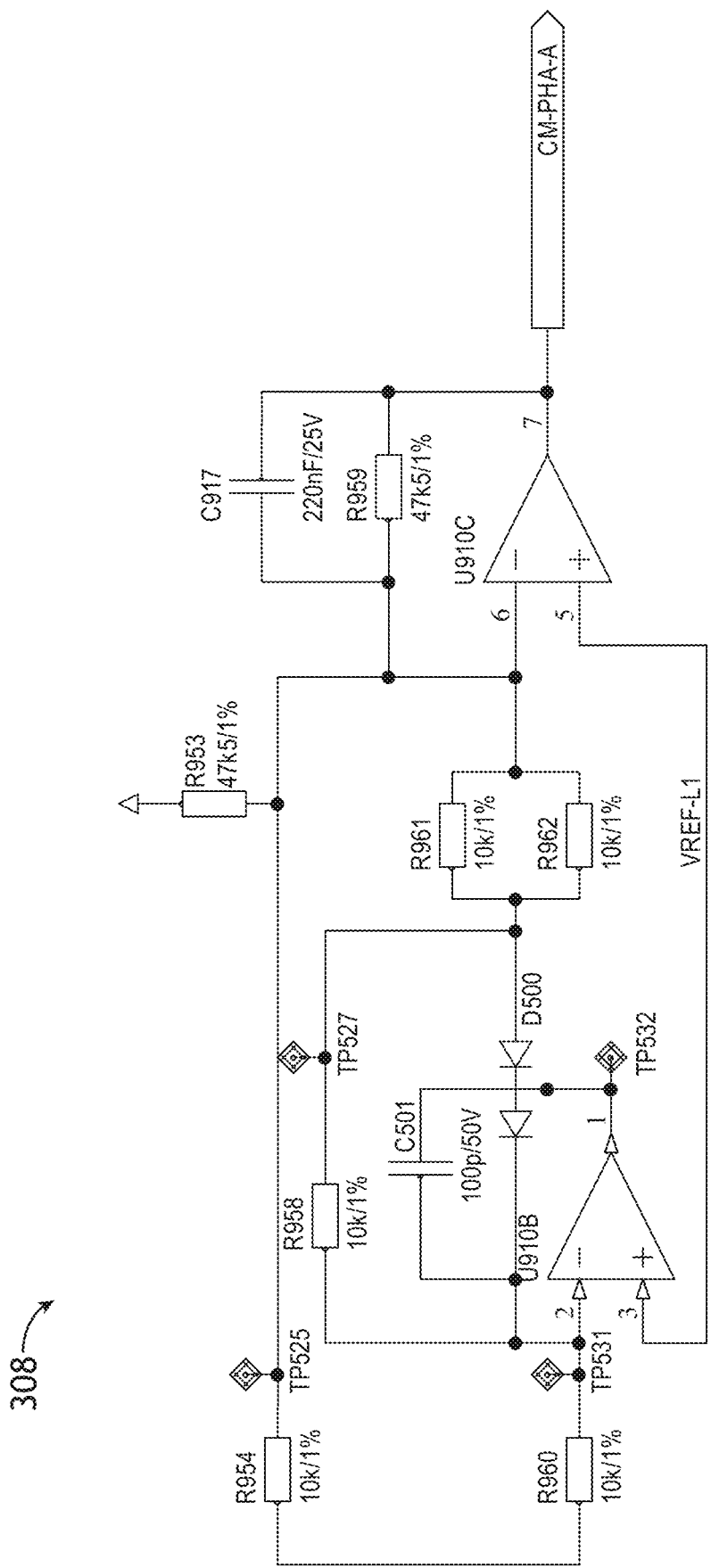
FIG. 3E is a schematic illustration of an active rectifier circuit for one phase of a power factor converter (PFC), in accordance with example embodiments of this disclosure.

Referring to FIG. 3D (illustrating current measurement circuit 306), the current is measured by a current transducer U6, which is placed in series with a boost coil L1. In an example embodiment, the current transducer U6 is a 25A-rated transducer, where the current path is routed four times through the transducer U6 to enhance the accuracy of the measurement. The transducer U6 is an integral part of switching stage of the PFC and is also used to monitor the line input current.

The active rectifier 308 (illustrated in FIG. 3E) converts the sinewave output voltage of the transducer U6 to a DC voltage, which is sent to an analog-to-digital converter (ADC). In an example embodiment, an ideal rectifier is used, eliminating the effect of the diode forward voltage drop.

Figure 3F:
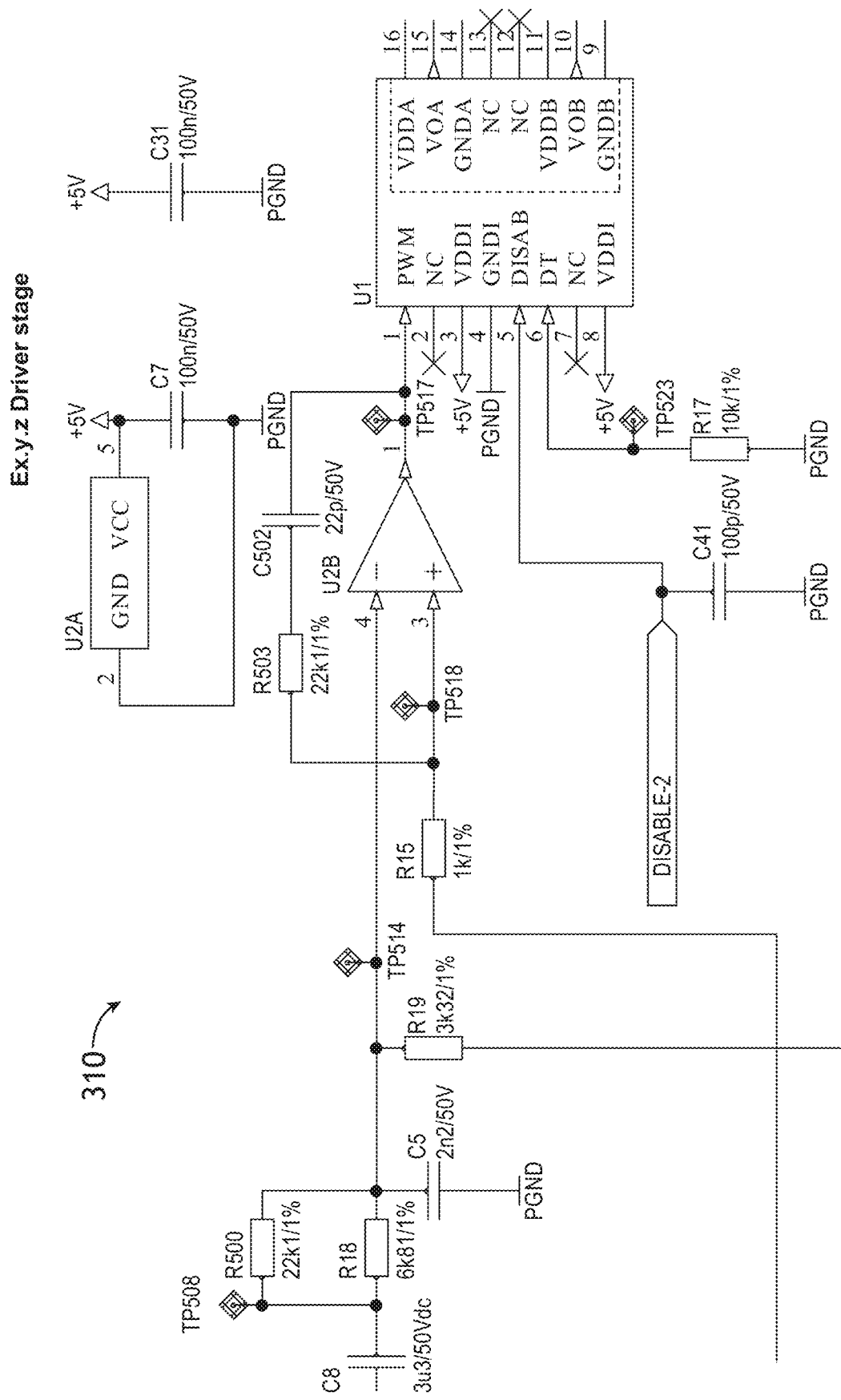
FIG. 3F is a schematic illustration of a driver stage circuit for one phase of a power factor converter (PFC), in accordance with example embodiments of this disclosure.
Figure 3G:
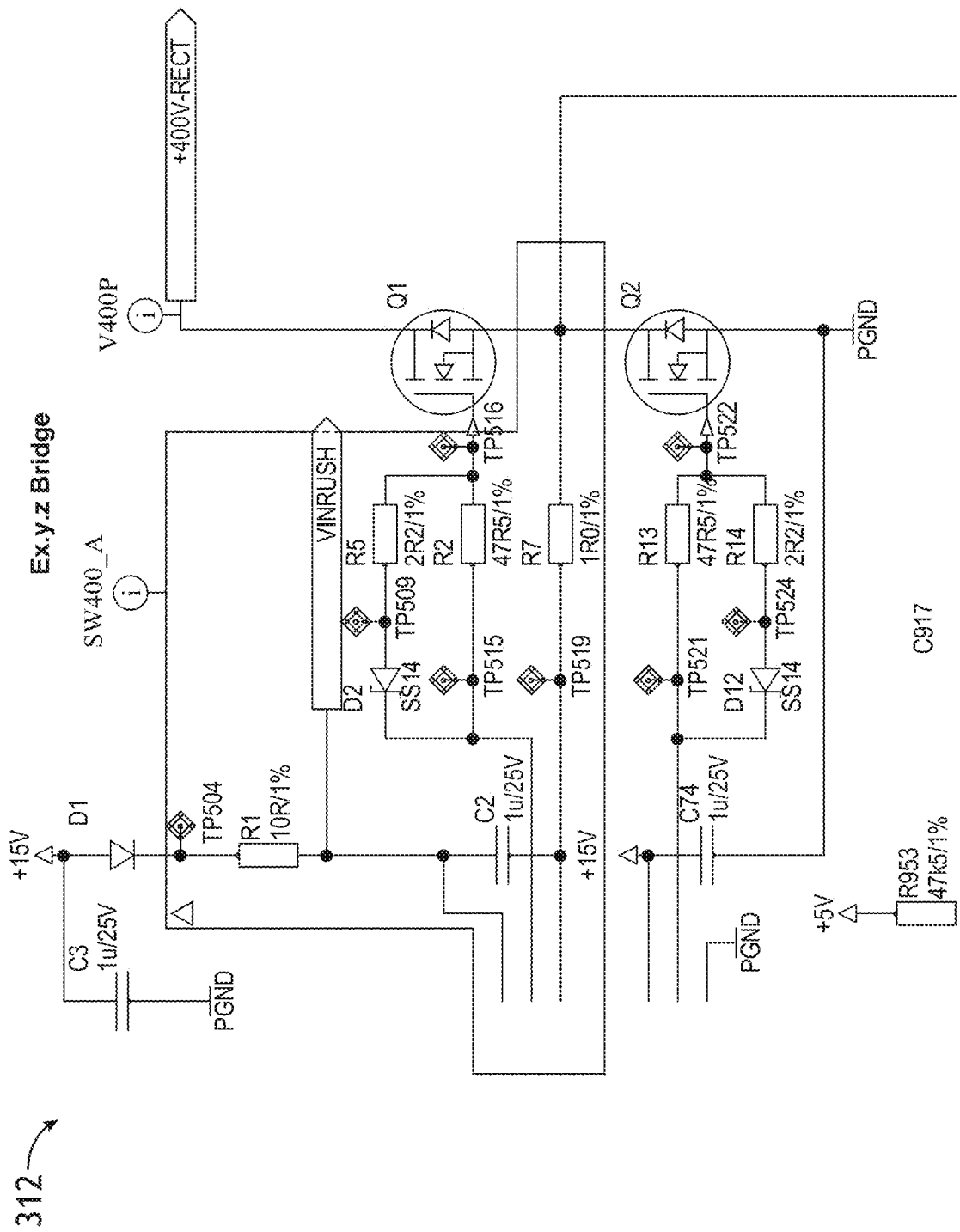
FIG. 3G is a schematic illustration of a MOSFET bridge circuit for one phase of a power factor converter (PFC), in accordance with example embodiments of this disclosure.

FIGS. 3F and 3G illustrate the driver stage 310 and MOSFET bridge 312, respectively. The driver stage 310 is the heart of the PFC regulation. The switching action of the PFC originates from a high-speed comparator U2B. The pulse-width modulated (PWM) output signal from the comparator U2B is input for a half bridge MOSFET driver U1. In an example embodiment, this driver U1 has floating high and low side driver stages, which can deliver an output current of up to 4A.

In an example embodiment, resistors R2 and R13 determine the switch-on speed of the MOSFET and are chosen relatively large for a slow switching on. R5 and R14 may determine the switch-off speed and are chosen to have a small value for fast switch-off. Dead time between the high and low side is regulated by R17. In an example embodiment, the value of 10 k gives a dead time of 100 ns.

Figure 4A:
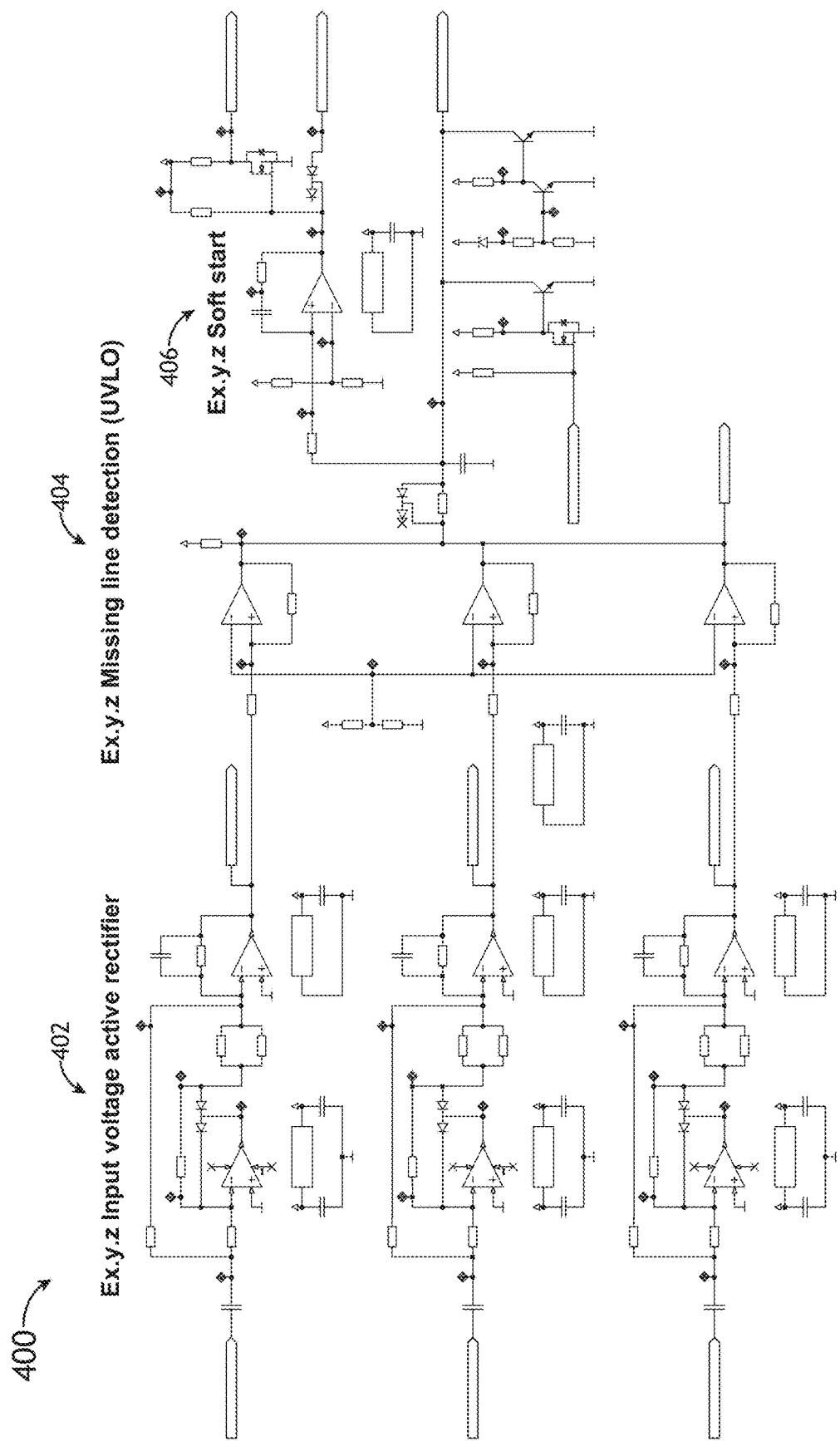
FIG. 4A is a schematic illustration of a voltage monitor of a power factor converter (PFC), in accordance with example embodiments of this disclosure.

FIGS. 4A through 4D are schematic illustrations of a voltage monitor 400 for a PFC, such as the PFC 100 described above, in accordance with example embodiments of this disclosure. As shown in FIG. 4A, the voltage monitor 400 may include an input voltage active rectifier 402, a missing line detection circuit 404, and a soft start circuit 406.

Figure 4B:
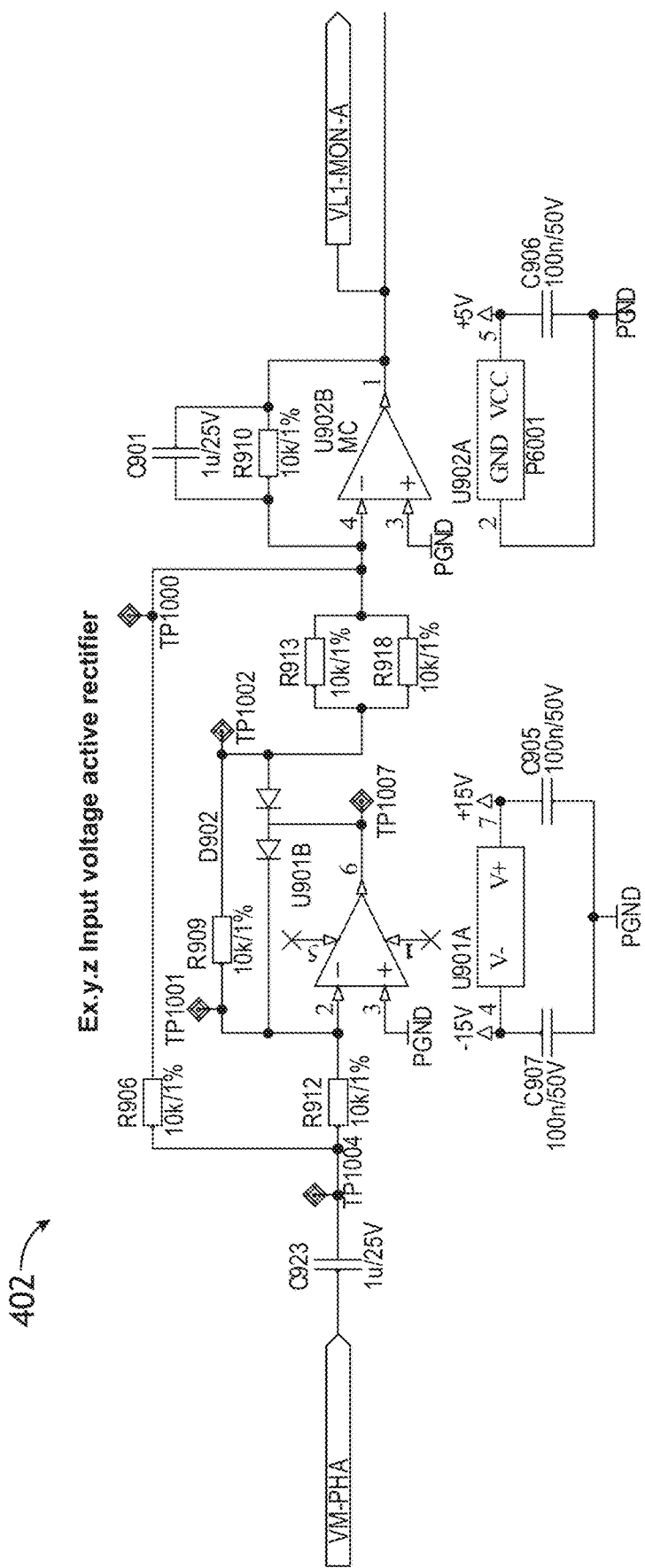
FIG. 4B is a schematic illustration of an input voltage active rectifier circuit for a voltage monitor of a power factor converter (PFC), in accordance with example embodiments of this disclosure.

Referring to FIG. 4B, the input voltage active rectifier 402 converts the sinewave voltage from the input voltage measurement circuit 302 to a DC voltage. This voltage is used for voltage monitoring and sent to an analog-to-digital converter (ADC) and is also used for the under voltage lock out (UVLO)/missing line detection circuit 404. In an example embodiment, rectification is performed by an ideal rectifier. The ripple on the rectified signal is filtered by capacitor C901. This capacitor determines the delay in rise and fall times, and therefore the delay in missing line detection.

Figure 4C:
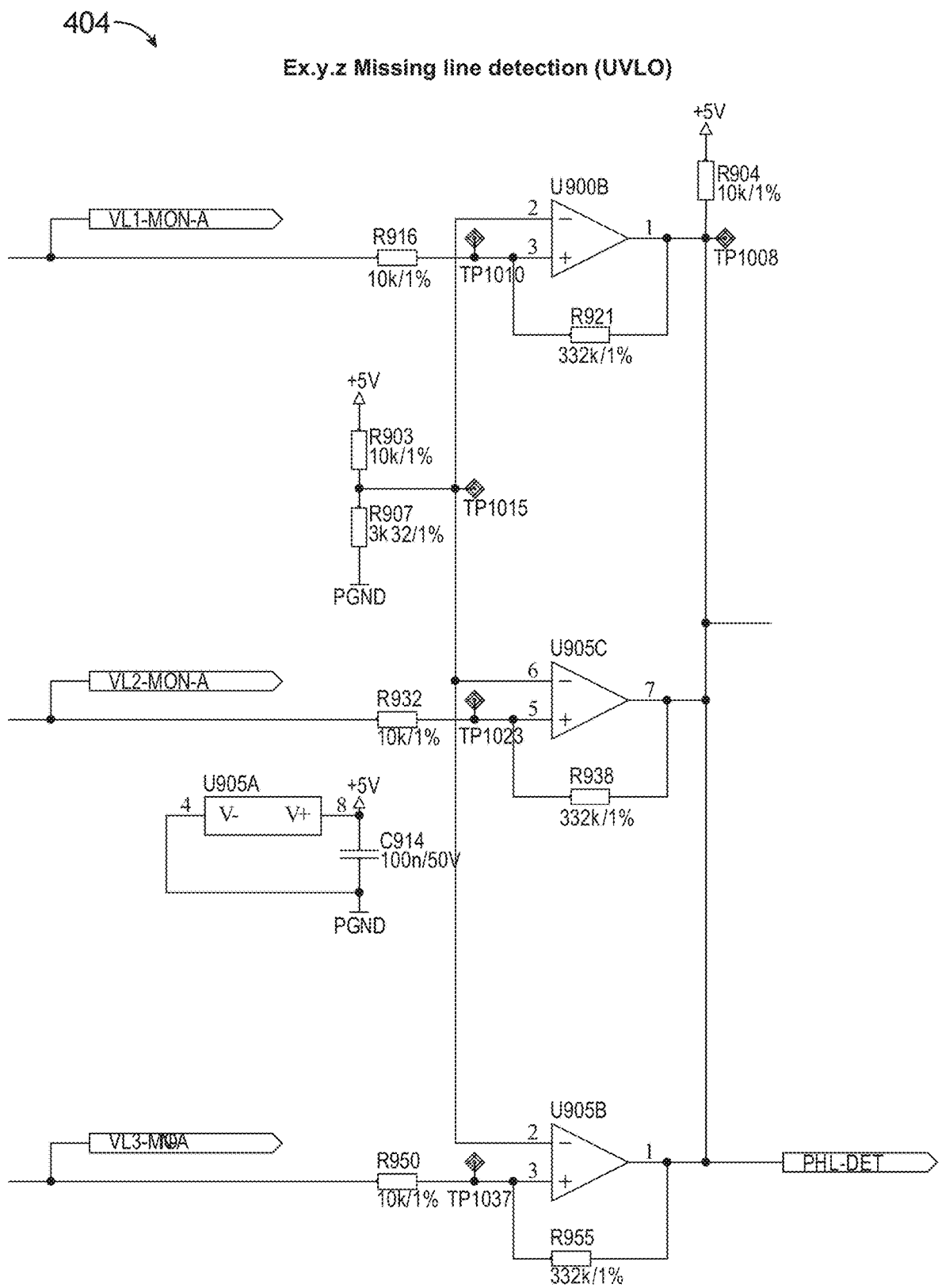
FIG. 4C is a schematic illustration of a missing line detection circuit for a voltage monitor of a power factor converter (PFC), in accordance with example embodiments of this disclosure.
Figure 4D:
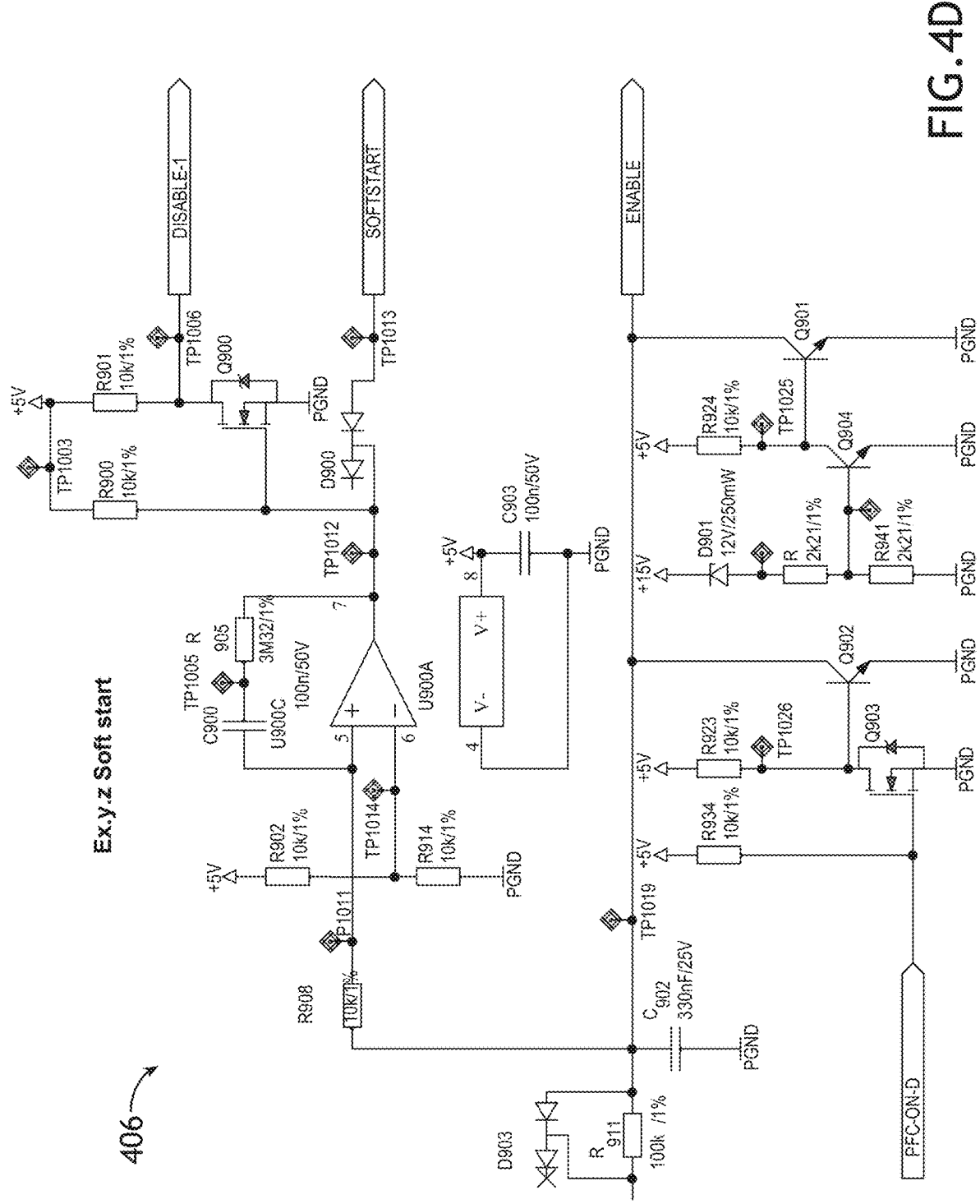
FIG. 4D is a schematic illustration of a soft start circuit for a voltage monitor of a power factor converter (PFC), in accordance with example embodiments of this disclosure.

FIGS. 4C and 4D illustrate the UVLO/missing line detection circuit 404 and the soft start circuit 406, respectively. The UVLO/missing line detection circuit 404 includes three comparators (e.g., comparators U900B, U905C, and U905B) configured to compare the output voltage of the active rectifier 402 of each phase with a DC threshold determined by R903 and R907. At start-up, when the voltages of all phases become higher than the threshold, soft start is enabled, and the ENABLE signal will slowly rise. Comparator U900C switches high when the ENABLE signal passes the threshold (e.g., 2.5V threshold) determined by the voltage divider implemented by resistors R902 and R914. The SOFTSTART signal is released and the DISABLE-1 signal goes low.

Figure 5A:
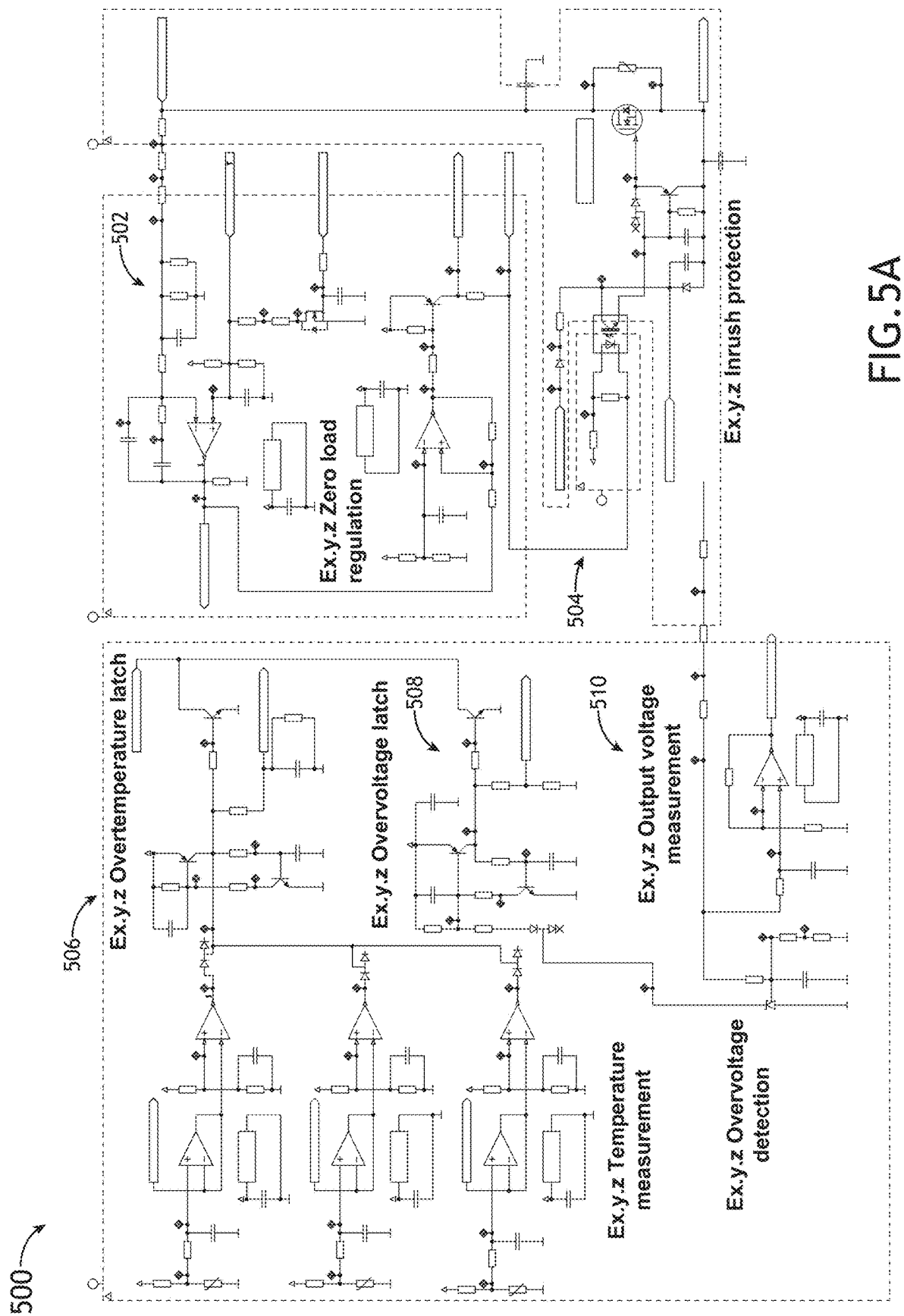
FIG. 5A is a schematic illustration of control circuitry for a power factor converter (PFC), in accordance with example embodiments of this disclosure.

FIGS. 5A through 5D are schematic illustrations of control circuitry 500 for a PFC, such as the PFC 100 described above, in accordance with example embodiments of this disclosure. As shown in FIG. 5A, the control circuitry 500 may include a zero-load regulation circuit 502, an inrush protection circuit 504, an overtemperature latch circuit 506, an overvoltage latch circuit 508, and an output voltage measurement circuit 510.

Figure 5B:
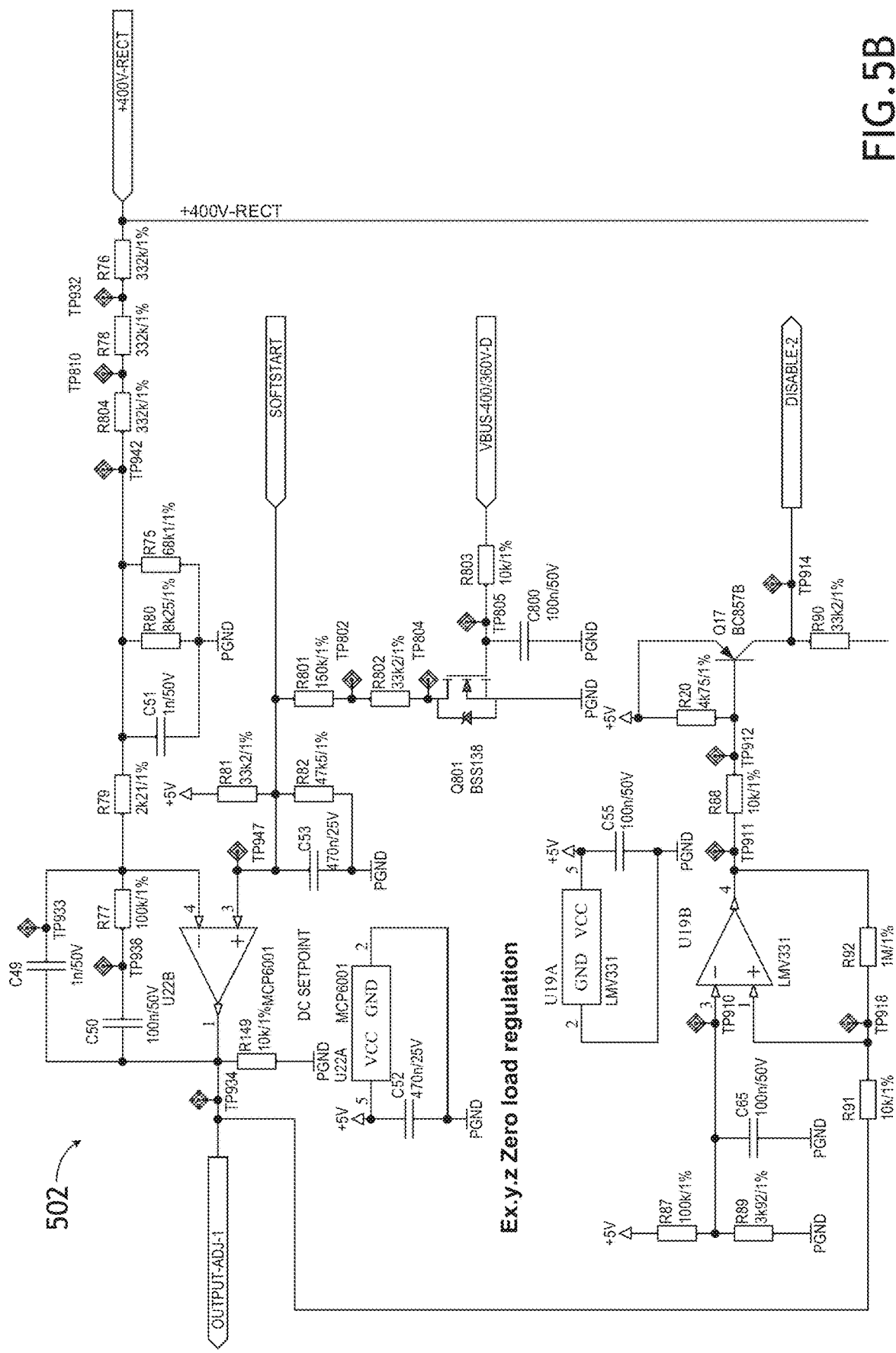
FIG. 5B is a schematic illustration of zero load regulation control circuitry for a power factor converter (PFC), in accordance with example embodiments of this disclosure.
Figure 5C:
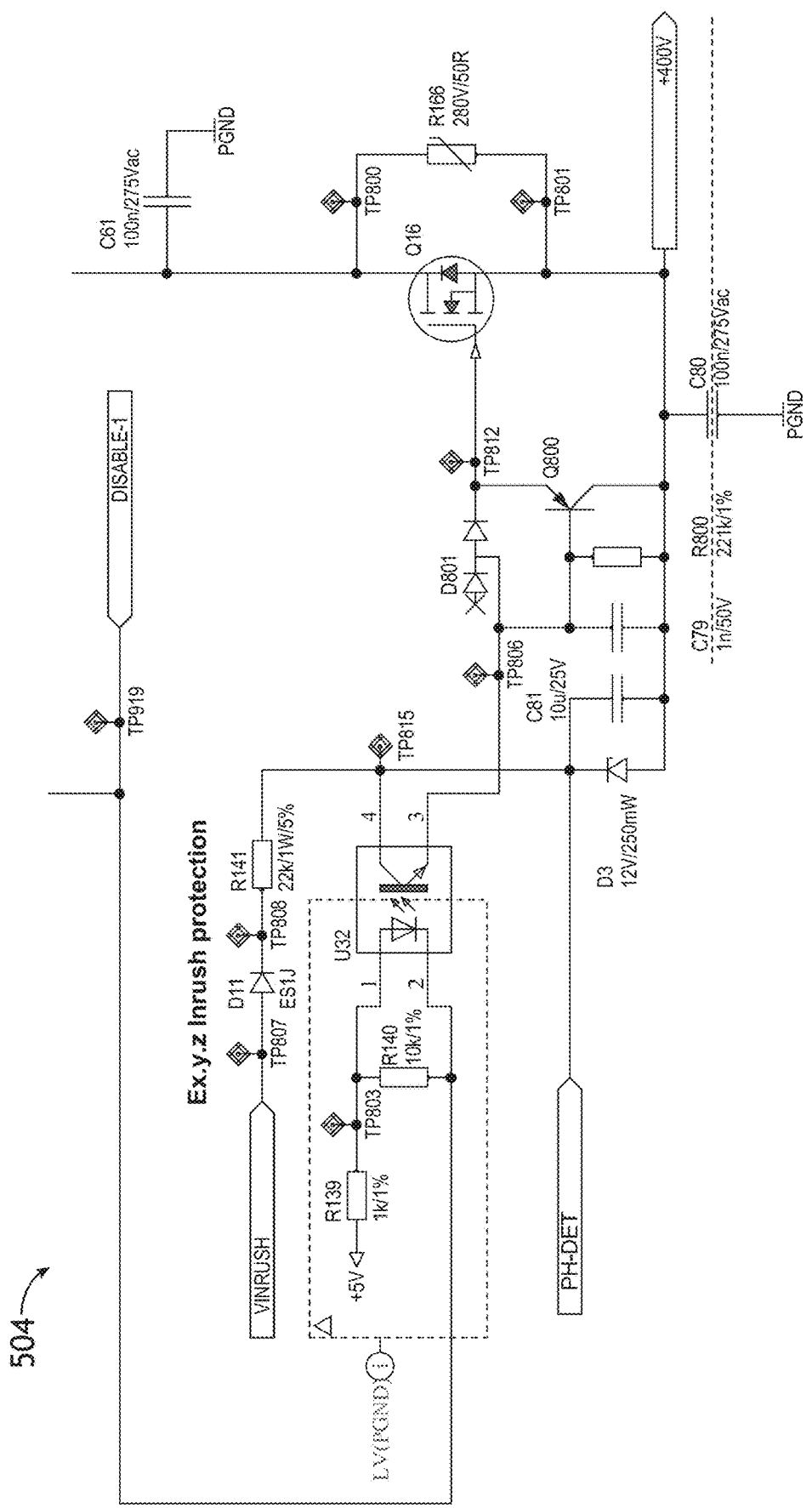
FIG. 5C is a schematic illustration of inrush protection control circuitry for a power factor converter (PFC), in accordance with example embodiments of this disclosure.

FIGS. 5B and 5C illustrate the zero-load regulation circuit 502 and the inrush protection circuit 504, respectively. Referring to FIG. 5B, the regulation of the bus voltage (e.g., 400V bus voltage) is performed by opamp U22B. This opamp controls the input line current of the three phases via the OUTPUT_ADJ-1 signal. In an example embodiment, the DC setpoint is determined by a voltage divider implemented by resistors R81 and R82, where capacitor C53 is the timing capacitor for the soft start.

To prevent an overvoltage situation in the case there is no load, a disable circuit is added. At low or zero load, OUTPUT-ADJ-1 is close to 0V. At a threshold voltage level (e.g., about 200 mV) determined by the voltage divider implemented by resistors R87 and R89, comparator U19B switches off all MOSFET drivers via signal DISABLE-2. No energy is transferred in this state. To maintain the output voltage (e.g., 400V), the DISABLE-2 signal will go intermittently high and low at a relatively low frequency.

This circuit will normally not be active at no load, because an offset on the inputs of the multipliers has been added (OUTPUT-ADJ-2).

Referring to FIG. 5C, the inrush current limit is established by a positive temperature coefficient (PTC) resistor R166 (e.g., 50Ω PTC), which is placed in the circuit between the MOSFET bridge and the bus capacitor (e.g., 220 uF electrolytic capacitor(s)). In an example embodiment, the PTC resistor R166 is chosen above a standard power resistor because the PTC resistor R166 will trip and thus protect itself in abnormal single fault situations, such as failure of the inrush current MOSFET.

At start-up the inrush current MOSFET will switch on after a short delay, determined by the rise of the ENABLE signal.

In an example embodiment, the enable/disable signals in the circuit have the following function:
ENABLE—Is released when the input and 15V supply voltages are present, PFC-ON-D signal from the Control board is high and no error is active. It is pulled low when one of these conditions is no longer valid.
DISABLE-1—Is pulled low after a short delay after the release of the ENABLE signal. This signal switches on the inrush limiter MOSFET and activates signal DISABLE-2.
DISABLE-2—When activated by pulling low, it enables the mosfet drivers U1, U7 and U13.

Figure 5D:
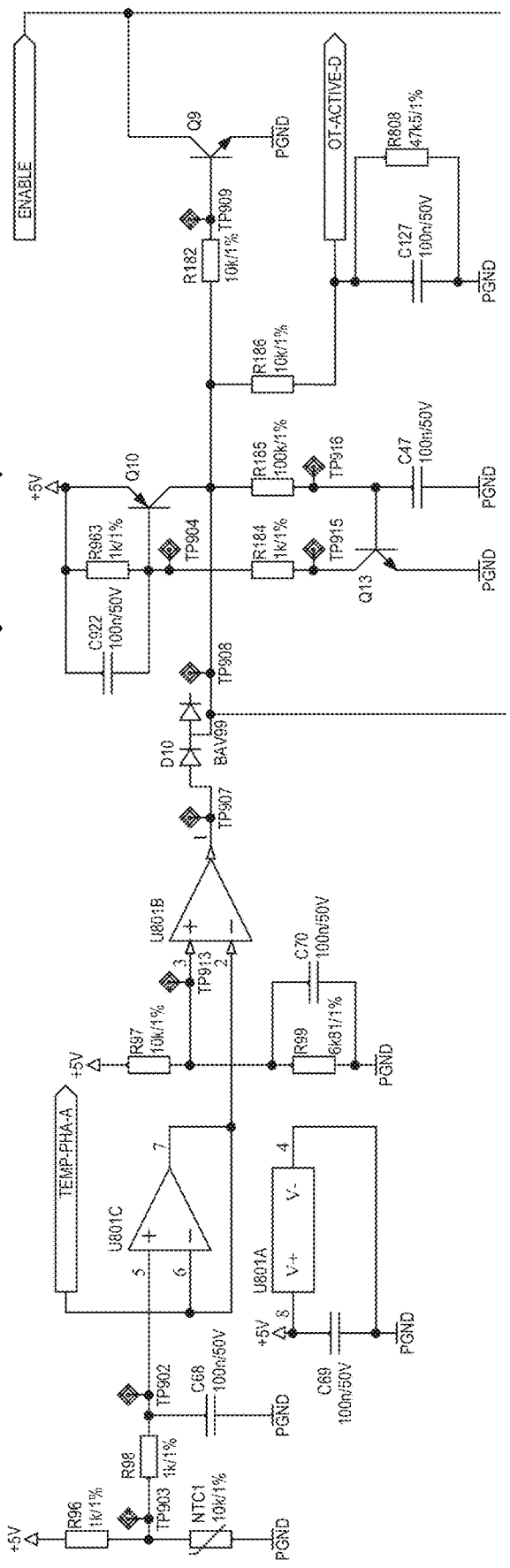
FIG. 5D is a schematic illustration of overtemperature latch control circuitry for a power factor converter (PFC), in accordance with example embodiments of this disclosure.

Referring to FIG. 5D (illustrating the overtemperature latch circuit 506), the temperature of each PFC coil may be measured by a negative temperature coefficient (NTC) resistor NTC1, placed close to the coil. NTC1 may be connected in series with a resistor R96 (e.g., 1KΩ resistor) next to the +5V supply. The voltage on the voltage divider implemented R96 and NTC1 is filtered and buffered by opamp U801C and sent to the ADC. A second opamp U801B may be used as a comparator. In an example embodiment, when the input voltage passes the threshold determined by a voltage divider implemented by resistors R97 and R99, the output of the comparator goes high and triggers the overtemperature latch.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

The invention claimed is:

1. A power factor converter, comprising:
a first output capacitor and a second output capacitor, wherein the first output capacitor is coupled to the second output capacitor, and wherein an artificial neutral is defined between the first output capacitor and the second output capacitor; and
a plurality of phases, each phase including:
a voltage measurement circuit configured to detect an input voltage;
a boost coil;
a current measurement circuit configured to detect a current in the corresponding boost coil included in a corresponding phase;
a current regulation circuit configured to receive an output of the corresponding voltage measurement circuit included in a corresponding phase;
a comparator configured to compare an output of the corresponding current regulation circuit included in a corresponding phase to the current in the corresponding boost coil in a corresponding phase; and a plurality of transistors driven by an output of the corresponding comparator in a corresponding phase, wherein the boost coil in each phase is coupled to a first transistor and a second transistor of the corresponding plurality of transistors in a corresponding phase, and the first transistor of each phase is coupled to the corresponding second transistor in a corresponding phase, wherein the first transistor of each phase is coupled to the first output capacitor and the second transistor of each phase is coupled to the second output capacitor, and wherein the voltage measurement circuit of each phase is configured to detect the input voltage by measuring input voltage between a load connection line and the artificial neutral.

2. The power factor converter of claim 1, wherein the plurality of phases comprise three phases.

3. The power factor converter of claim 1, wherein the plurality of transistors in each phase comprise a plurality of MOSFETs.

4. The power factor converter of claim 3, wherein the plurality of MOSFETs are silicon carbide (SiC) MOSFETs.

5. The power factor converter of claim 3, wherein the plurality of MOSFETs are arranged in a half bridge configuration.

6. The power factor converter of claim 3, wherein the plurality of MOSFETs are arranged in a totem pole configuration.

7. A device, comprising:

a component; and a power supply configured to furnish electrical power to the component, the power supply including a multi-phase power factor converter comprising a first output capacitor and a second output capacitor, wherein the first output capacitor is coupled to the second output capacitor, and wherein an artificial neutral is defined between the first output capacitor and the second output capacitor, each phase of the multi-phase power factor converter including:

a voltage measurement circuit configured to detect an input voltage;

a boost coil;

a current measurement circuit configured to detect a current in the corresponding boost coil included in a corresponding phase;

a current regulation circuit configured to receive an output of the corresponding voltage measurement circuit included in a corresponding phase;

a comparator configured to compare an output of the corresponding current regulation circuit included in a corresponding phase to the current in the corresponding boost coil included in a corresponding phase; and a plurality of transistors driven by an output of the corresponding comparator included in a corresponding phase, wherein the boost coil in each phase is coupled to a first transistor and a second transistor of the corresponding plurality of transistors included in a corresponding phase, and the first transistor of each phase is coupled to the corresponding second transistor included in a corresponding phase, wherein the first transistor of each phase is coupled to the first output capacitor and the second transistor of each phase is coupled to the second output capacitor, and wherein the voltage measurement circuit in each phase is configured to detect the input voltage by measuring input voltage between a load connection line and the artificial neutral.

8. The device of claim 7, wherein the multi-phase power factor converter comprises a three-phase power factor converter.

9. The device of claim 7, wherein the plurality of transistors in each phase comprise a plurality of MOSFETs.

10. The device of claim 9, wherein the plurality of MOSFETs are silicon carbide (SiC) MOSFETs.

11. The device of claim 9, wherein the plurality of MOSFETs are arranged in a half bridge configuration.

12. The device of claim 9, wherein the plurality of MOSFETs are arranged in a totem pole configuration.

* * * * *